Patented Jan. 5, 1954

2,665,265

UNITED STATES PATENT OFFICE 2,665,265

SYNTHETIC RESIN COMPOSITIONS HAVING IMPROVED LIGHT STABILITY

Arthur Reginald Burgess, Welwyn Garden City, England, assignor to Imperial Chemical Industries Limited, a corporation of Great Britain No Drawing. Application August 27, 1951, Serial No. 243,909

Claims priority, application Great Britain September 22, 1950

4 Claims. (Cl. 260—45.75)

This invention relates to new synthetic resin compositions having improved stability.

A common defect of synthetic resins is that prolonged exposure to the weather, particularly to bright sunlight, causes deterioration in their mechanical and physical characteristics. This deterioration is largely due to oxidation and under certain circumstances constitutes a serious disadvantage. Thus, for example, electrical insulation consisting of synthetic resins is liable to embrittlement, increase of power factor and loss of electrical resistance if it is used in exposed locations. Another example is the colour instability of transparent synthetic resins on ageing in sunlight.

The object of the present invention is to provide synthetic resin compositions which have improved stability to light and particularly to ultraviolet light.

According to the present invention we provide a composition comprising a synthetic resin and not more than 10% by weight of said resin of a chelate compound of copper or nickel with an aromatic o-hydroxy azo compound.

The metal chelate compounds of the compositions of this invention contain the group

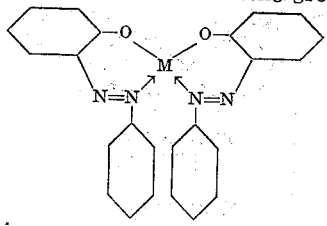

where M is copper or nickel and in which the aryl rings may be substituted, for example, with alkyl or aryl groups or with —OH, OR, NR$_2$ or COOR groups, where R is an alkyl or aryl group, or may be fused with one or more further aryl rings.

Orthohydroxy azo compounds for use in forming the chelate compounds are most easily prepared by coupling an aromatic diazo compound with a phenol which is already substituted in the para position. Therefore, for ease of preparation, the preferred chelate compounds for use in the compositions of this invention are those derived from azo phenols which are substituted in the position para to the hydroxyl group. Suitable chelate compounds include the copper and nickel complexes formed with benzene azo-p-cresol and benzene azo-β-naphthol. Copper and nickel bis(benzene azo-p-cresol) have been found to be particularly effective in the compositions of the invention.

The compounds may be prepared by mixing the appropriate hydroxy azo compound with a base or salt of the metal in the presence of dilute alkali. Preparation of the copper derivative of benzene azo-p-cresol, using copper sulphate, may be represented as follows:

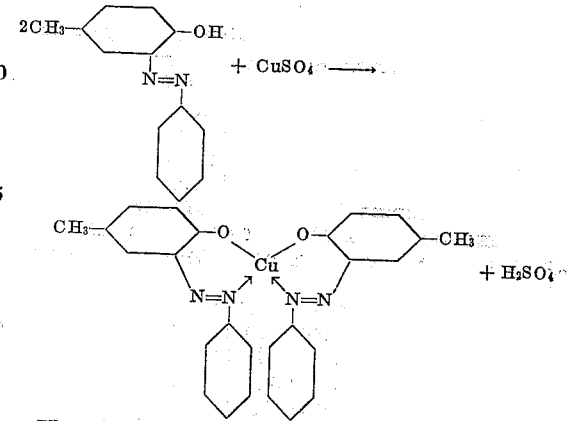

The chelate compounds used in the compositions of this invention are effective with such diverse synthetic resins as polystyrene, polyvinyl chloride, linear superpolyamides and Polythene. Synthetic resins of the thermoplastic type are in general more susceptible to light than are the thermosetting materials and are also more frequently used in applications where appearance and colour is important. Among thermoplastic synthetic resins, polymerised hydrocarbons such as Polythene, linear superpolyamides (commonly known as Nylon), and polyvinyl chloride are particularly liable to degradation by photochemical oxidation when exposed to sunlight, and are frequently used under conditions where such oxidation is liable to occur, particularly for electrical insulation in cables, and for pipes and tubes. Other applications where exposure to sunlight is likely to occur include films for wrapping and similar purposes, and, in the case of nylon, as fabrics. Consequently the present invention has particular significance in connection with the outdoor use of thermoplastic materials, and especially of polymerised hydrocarbons such as Polythene, linear superpolyamides and polyvinyl chloride.

The chelate compound is preferably used in a finely divided state, and may be mixed with the synthetic resin by any suitable method which will effect thorough distribution. The precise method employed will depend upon the particular synthetic resin to be compounded. One method is to carry out the mixing by milling the materials on heated rolls, such as are used in the compounding of rubber, or on other suitable milling or mixing equipment, such as a Banbury mixer. The chelate compound may also be added to a solution or suspension of the synthetic resin and the solvent or dispersing medium subsequently removed by vaporisation. Alternatively, the chelate compound may be incorporated with the synthetic resin at a convenient stage in the production of the latter.

Other ancillary ingredients such as fillers, extenders, plasticisers, lubricants, dyes, pigments, thermal antioxidants and the like may also be incorporated in the compositions of the present invention.

The chelate compounds have no serious effect upon the other physical and mechanical properties of the synthetic resins. Accordingly the compositions of the present invention may be converted into films, coatings and fibres or fabricated into shaped articles by conventional techniques.

The invention is illustrated but in no way limited by the following example, in which all parts given are by weight:

Example 100 parts of Polythene having a viscosity at 190° C. of 400 poises and an average molecular weight of 12,000 were milled at 150° C. for 10 minutes with 1 part of metal chelate compound. The mill used for this purpose was one of a type conventionally used for milling rubber. The resulting composition was shaped into a flat sheet having a thickness of about 20 mils by pressing in a steam press at 160° C. for 4 minutes between platens under a pressure of 70 tons per square inch.

A sample of the sheet was tested by exposing it, with a sample of a sheet of the same Polythene prepared in the same way but containing no chelate compound, at a temperature of 25° C., to light from a tubular mercury vapour lamp. The lamp was placed at the centre of a double-walled silica vessel, and an aqueous solution of copper sulphate containing 75 gms. copper sulphate ($CuSO_4.5H_2O$) per litre was circulated through the wall of the vessel. The wall chamber had an internal diameter of 5 cms. and an external diameter of 8 cms. The samples to be tested were mounted on a rotating drum, 21 cms. in diameter, which was symmetrically placed round the vessel enclosing the lamp, and a stream of air was passed continuously through the space between the drum and the silica vessel. The wave length range of the light from the mercury vapour lamp was restricted, by passage through the copper sulphate solution, to values greater than 2950 Angstrom units. This lower limit of 2950 Angstrom units corresponds approximately to the shortest wave length present in radiation from the sun.

After a period of exposure the ratio of the concentration of carbonyl groups in the treated and untreated samples was determined by measurement of the infra-red absorption at 1720 wave nos.

The concentration of carbonyl groups in the specimen gives a measure of the extent to which oxidation of the specimen has occurred. Also, since the power factor of polyethylene is directly proportional to the concentration of carbonyl groups, determination of the ratio described above provides a convenient method of comparing the efficiencies as stabilisers of different compounds.

Copper and nickel bis(benzene azo-p-cresol) were tested in the manner described and the results obtained are indicated in the following table, in which the fourth column shows the ratios of the carbonyl group concentrations in the exposed treated samples to that in an exposed untreated sample.

| Chelate compound employed | Percent chelate compound present | Time of exposure | Carbonyl group ratio |
| --- | --- | --- | --- |
| Copper bis(benzene azo-p-cresol) | 1 | 8 weeks | 0.100 |
| Nickel bis(benzene azo-p-cresol) | 1 | ---do------- | 0.014 |

I claim:

1. A composition comprising a synthetic resin subject to degradation by light and an effective amount not in excess of 10% by weight of said resin of a chelate compound of a metal selected from the group consisting of copper and nickel with an aromatic compound selected from the group consisting of benzene azo-p-cresol and benzene azo-$\beta$-naphthol.

2. A composition as recited in claim 1 in which the said synthetic resin is polyethylene.

3. A composition as recited in claim 1 in which the said synthetic resin is polystyrene.

4. A composition as recited in claim 1 in which the said synthetic resin is polyvinyl chloride.

ARTHUR REGINALD BURGESS.

No references cited.